United States Patent
Neupane et al.

(10) Patent No.: US 12,425,433 B2
(45) Date of Patent: Sep. 23, 2025

(54) ADVERSARIAL TRAINING FOR MALICIOUS PROTOCOL DATA UNIT DETECTION WITH FIELD VALUE PERTURBATIONS

(71) Applicant: Palo Alto Networks, Inc., Santa Clara, CA (US)

(72) Inventors: Ajaya Neupane, San Jose, CA (US); Yu Fu, Los Gatos, CA (US); Lei Xu, Palo Alto, CA (US); Mei Wang, Saratoga, CA (US); Fikirte Ayalke Demmese, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 100 days.

(21) Appl. No.: 18/482,719

(22) Filed: Oct. 6, 2023

(65) Prior Publication Data
US 2025/0119442 A1   Apr. 10, 2025

(51) Int. Cl.
*H04L 9/40* (2022.01)
*H04L 41/16* (2022.01)

(52) U.S. Cl.
CPC ........ *H04L 63/1425* (2013.01); *H04L 41/16* (2013.01); *H04L 63/1466* (2013.01)

(58) Field of Classification Search
CPC .. H04L 41/16; H04L 63/1425; H04L 63/1466
See application file for complete search history.

(56) References Cited

U.S. PATENT DOCUMENTS

| | | | | |
|---|---|---|---|---|
| 8,953,519 | B2* | 2/2015 | Bucknell | H04W 28/02 370/328 |
| 9,473,380 | B1* | 10/2016 | Bermudez | G06F 16/80 |
| 12,231,524 | B2* | 2/2025 | Kim | H04L 69/04 |
| 2010/0278111 | A1* | 11/2010 | Kashima | H04W 28/065 370/328 |
| 2017/0289021 | A1* | 10/2017 | Säily | H04W 36/28 |
| 2019/0081746 | A1* | 3/2019 | Han | H04L 1/1896 |
| 2019/0159067 | A1* | 5/2019 | Yi | H04W 28/065 |
| 2020/0374962 | A1* | 11/2020 | Wu | H04W 36/037 |
| 2021/0112406 | A1* | 4/2021 | Jiang | H04W 12/02 |
| 2021/0255594 | A1* | 8/2021 | Prisco | G05B 19/042 |
| 2022/0321607 | A1* | 10/2022 | Peinado Gomez | H04W 12/088 |

(Continued)

OTHER PUBLICATIONS

Demmese, et al., "Machine Learning based Fileless Malware Traffic Classification Using Image Visualization", Cybersecurity 6, 32 (2023). https://doi.org/10.1186/s42400-023-00170-z, Dec. 2, 2023, 18 pages.

*Primary Examiner* — Gary S Gracia
(74) *Attorney, Agent, or Firm* — Gilliam IP PLLC (57) ABSTRACT

A modular adversarial training data generator ("generator") generates adversarial training data for a machine learning (ML) model to detect malicious protocol data units (PDUs). The adversarial training data mimics high volume cyberattacks by perturbing PDUs to bypass malicious detection systems. For Hypertext Transfer Protocol (HTTP) PDUs, the generator rearranged, replaces, and grid searches values of HTTP header fields to generate the adversarial training data. The generator further biases grid search based on metrics for values of HTTP header fields that quantify impact of replacing the values on malicious verdicts by ML models trained on the adversarial training data.

20 Claims, 6 Drawing Sheets

(56) References Cited

U.S. PATENT DOCUMENTS

| | | | | |
|---|---|---|---|---|
| 2022/0377763 | A1* | 11/2022 | Nordström | H04W 8/04 |
| 2022/0407730 | A1* | 12/2022 | Li | H04W 76/40 |
| 2023/0094211 | A1* | 3/2023 | Kim | H04W 36/00698 |
| | | | | 370/331 |
| 2023/0107148 | A1* | 4/2023 | Taheri | G06F 40/143 |
| | | | | 370/252 |
| 2023/0216783 | A1* | 7/2023 | Budvytis | H04L 47/805 |
| | | | | 370/235 |
| 2023/0269263 | A1* | 8/2023 | Yarabolu | G06F 18/2155 |
| | | | | 726/22 |
| 2023/0368077 | A1* | 11/2023 | Yao | G06N 20/00 |
| 2023/0396543 | A1* | 12/2023 | Tenny | H04W 40/02 |
| 2023/0397056 | A1* | 12/2023 | Zhou | H04W 36/0069 |
| 2024/0014943 | A1* | 1/2024 | Kuo | H04L 1/1822 |
| 2024/0340784 | A1* | 10/2024 | Ly | H04W 84/18 |
| 2024/0389139 | A1* | 11/2024 | Cherian | H04L 1/0057 |
| 2024/0389140 | A1* | 11/2024 | Cherian | H04W 74/0808 |
| 2025/0023890 | A1* | 1/2025 | Wang | H04L 9/00 |
| 2025/0030714 | A1* | 1/2025 | Xu | H04L 63/162 |
| 2025/0119442 | A1* | 4/2025 | Neupane | H04L 41/16 |

\* cited by examiner

ADVERSARIAL TRAINING FOR MALICIOUS PROTOCOL DATA UNIT DETECTION WITH FIELD VALUE PERTURBATIONS

BACKGROUND

The disclosure generally relates to data processing (e.g., CPC subclass G06F) and to computing arrangements based on specific computational models (e.g., CPC subclass G06N).

Hypertext Transfer Protocol (HTTP) is an application layer protocol with a client-server model where clients communicate requests to servers and servers respond with responses. Protocol data units (PDUs) for HTTP, alternatively referred to as "messages" are delineated between HTTP requests and HTTP responses. HTTP request PDUs comprise an HTTP request method as the first field that is immutable and HTTP response PDUs comprise an HTTP response status code as the first field that is also immutable. HTTP request and HTTP response PDUs additionally comprise request header fields and response header fields, respectively, that can be rearranged without affecting functionality of the HTTP PDUs (i.e., how a recipient handles the HTTP PDUs).

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. For instance, this disclosure refers to perturbing HTTP headers in illustrative examples. Aspects of this disclosure can be also applied to PDUs of other protocols, such as File Transfer Protocol (FTP) or the Domain Name System (DNS) protocol. In other instances, well-known instruction instances, protocols, structures, and techniques have not been shown in detail for conciseness.

Overview

High volume cyberattacks such as command and control (C2) attacks allow attackers to design and deploy crafted PDUs that evade detection systems by perturbing PDUs without changing malicious functionality of those PDUs according to corresponding protocols. "Functionality" as used herein refers to a sequence of actions taken by a recipient of a PDU in response to receipt of the PDU such as initiating processes, communicating additional PDUs over the Internet, etc. As an illustrative example, attackers can randomly permute fields in HTTP headers of HTTP PDUs (i.e., HTTP messages) without changing functionality to potentially avoid detection. ML models trained to detect malicious attacks can suffer from unknown bias in training data such as ordering or structure of PDUs and preprocessed versions thereof, leading to vulnerabilities against such cyberattacks. In particular, ML models designed to learn sequence-based context are prone to reordering attacks such as rearrangement of HTTP header fields. Moreover, in many contexts, attackers can communicate high volumes of PDUs to determine corresponding success based on structure of those PDUs and can maintain a knowledge base that tracks vulnerabilities according to PDU structure to increase success of evasion from malware detection systems.

The methodology disclosed herein generates robust training data for ML models that detect malicious PDUs by mimicking malicious attacks during training data generation. For HTTP traffic, an adversarial training data generator ("generator") perturbs header fields in known malicious and benign HTTP PDUs at random, via reordering, and via various grid search-based approaches that would be commonly used in a C2 attack. Perturbations of header fields by the generator vary by importance—low importance header fields are frequently removed from training data, whereas medium and high importance header fields are more frequently perturbed. Reordering perturbations randomly reorder header fields and corresponding values depending on importance, random perturbations replace values of randomly selected header fields with values chosen at random from lists of known values for those header fields, and grid search generates sequences of perturbed PDUs that iterate through values of each high importance header field in a search space, such as a product space of lists of values for each header field. The generator can further optimize grid search by building a knowledge base for the known malicious/benign PDUs that identifies certain header field values that lower confidence of malicious verdicts by trained ML models. Training and deploying ML models for malicious PDU detection with data from the generator both up-samples training data and strengthens the models in the face of high volume cyberattacks.

Example Illustrations

Figure 1:
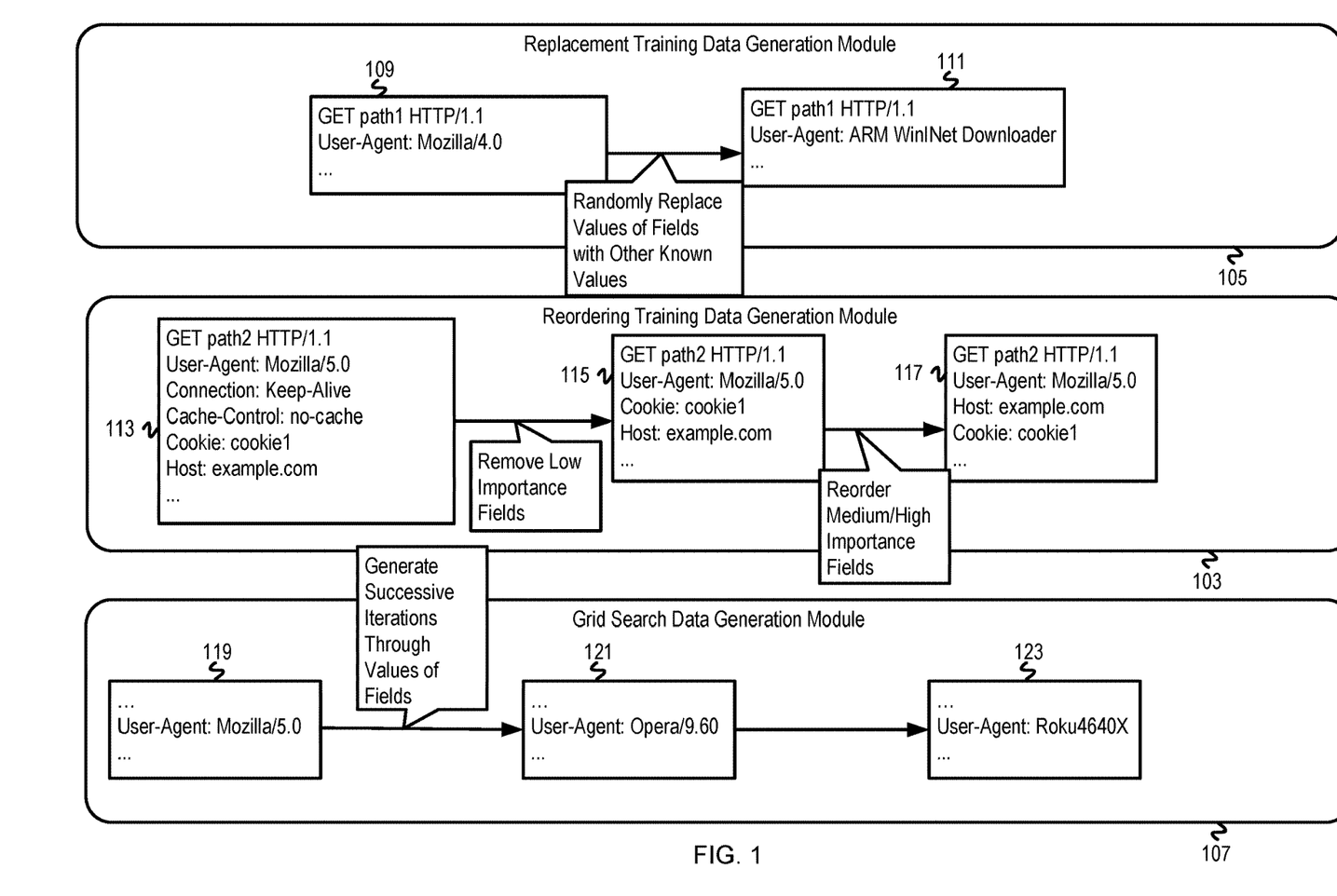
FIG. 1 is a schematic diagram of example modules for generating adversarial training data for machine learning (MIL) models that detect malicious PDUs via perturbations including replacement, reordering, and grid search.

FIG. 1 is a schematic diagram of example modules for generating adversarial training data for ML models that detect malicious PDUs via perturbations including replacement, reordering, and grid search. The PDUs in FIG. 1 are depicted for HTTP, and the operations of reordering and certain replacements of values of HTTP header fields do not affect or minimally affect functionality of the PDUs. In other examples, similar alterations of PDUs can be made for other protocols such as FTP DNS, etc.

A replacement training data generation module ("replacement module") 105 augments training data comprising HTTP PDUs by randomly replacing values of HTTP header fields. For instance, the replacement module 105 can select a specified number of HTTP header fields uniformly at random—with the exception of the first HTTP header field indicating an HTTP request method or an HTTP response status code which cannot be replaced without affecting functionality—and, for each randomly selected HTTP header field, can replace the value of the HTTP header field with a random distinct value chosen from a list of known values for the HTTP header field. Alternatively, the HTTP header fields can be chosen with a biased distribution, for instance a distribution that selects high or medium importance HTTP header fields according to known importance of HTTP header fields for malicious detection from domain-level knowledge. For each initial PDU of training data that corresponds to a known malicious or benign verdict, the replacement module 105 can generate multiple additional PDUs via multiple replacements that can have more or fewer values of HTTP header fields replaced.

An example HTTP PDU 109 comprises a header with the following fields:
GET path1 HTTP/1.1
User-Agent: Mozilla/4.0
. . .
The replacement module 105 randomly selects the User-Agent field among other HTTP header fields not depicted and replaces the value of the User-Agent field of the HTTP PDU 109 with the value "ARM WinINet-Downloader," which results in generating an HTTP PDU 111 with the following fields:
GET path1 HTTP/1.1
User-Agent: ARM WinINetDownloader
. . .
The value "ARM WinINetDownloader" is chosen at random from a list of known User-Agents that can include additional User-Agents such as "Mozilla/4.0", and each value can include additional information such as system information, platform information, and extensions omitted from the PDUs 109, 111 for simplicity.

A reordering training data generation module ("reordering module") 103 augments training data comprising HTTP PDUs by removing low importance fields and reordering medium/high importance fields. The operation of removing low importance fields has minimal impact on functionality of the HTTP PDUs, and the operation of reordering medium/high importance fields has no impact on functionality. An example HTTP PDU 113 comprises a header with the following fields:
GET path2 HTTP/1.1
User-Agent: Mozilla/5.0
Connection: Keep-Alive
Cache-Control: no-cache
Cookie: cookie1
Host: example.com
. . .
For the example HTTP PDU 113, the reordering module 103 determines that the Connection and the Cache-Control HTTP header fields are low importance and removes them to generate example HTTP PDU 115 with the following fields:
GET path2 HTTP/1.1
User-Agent: Mozilla/5.0
Cookie: cookie1
Host: example.com
. . .
The reordering module 103 then reorders the remaining medium/high importance fields to generate example HTTP PDU 117 that comprises the following fields:
GET path2 HTTP/1.1
User-Agent: Mozilla/5.0
Host: example.com
Cookie: cookie1
. . .

Low, medium, and high importance HTTP header fields are predetermined based on domain-level knowledge. For instance, experts can run sandbox environments that execute malicious HTTP messages and remove fields to determine whether the resulting actions taken by the sandbox environments correspond to a malicious attack. High/medium importance HTTP header fields can be header fields that, when modified, tend to alter or negate malicious attacks, whereas low importance HTTP header fields can be header fields that tend to have no effect on whether a malicious attack occurs. In the depicted example, the Cookie and Host HTTP header fields were switched in the ordering of header fields by the reordering module 103. More generally, the reordering module 103 can randomly switch pairs or tuples of HTTP header fields according to a distribution (e.g., uniformly at random) and multiple times, resulting in multiple PDUs of training data generated from an original PDU with a ground truth verdict. Example high importance HTTP header fields can comprise Host fields and Cookie fields, medium importance HTTP header fields can comprise User-Agent fields, Origin fields, Content fields, and Referrer fields, and low importance HTTP header fields can comprise Cache-Control fields, Accept-Language fields, Accept-Datetime fields, Accept-Encoding fields, Accept-Charset fields, and Connection fields.

A grid search data generation module ("grid search module") 107 augments training data comprising HTTP PDUs by performing grid search on values of the HTTP header fields. The grid search module 107 performs grid search according to a grid search algorithm that can incorporate metadata for values of HTTP header fields such as whether they increase or decrease confidence of malicious verdicts. Prior to developing a knowledge base of the impact that replacing HTTP header fields with particular values has on confidence of a malicious verdict, the grid search module 107 can initially perform a naïve search that iterates through a product space of values of HTTP header fields based on lists of known values for each HTTP header field. The known values can be determined, for instance, by communicating HTTP requests to top-n most popular webpages on the Internet (e.g., n=10000) and extracting the values from the benign HTTP responses. In the depicted example, an example HTTP PDU 119 comprises the value "Mozilla/5.0" for the User-Agent field that the grid search module 107 replaces with the value "Opera/9.60" in example HTTP PDU 121 and with the value "Roku4640X" in example HTTP PDU 123 during grid search.

Once the grid search module 107 develops a knowledge base for values of HTTP header fields, the grid search algorithm can bias towards values of HTTP header fields that tend to lower confidence of malicious verdicts so that the training data is more adversarial. Operations and components for developing a knowledge base for values of HTTP header fields (labelled a "reconnaissance knowledge base") are described in reference to FIG. 2.

Figure 2:
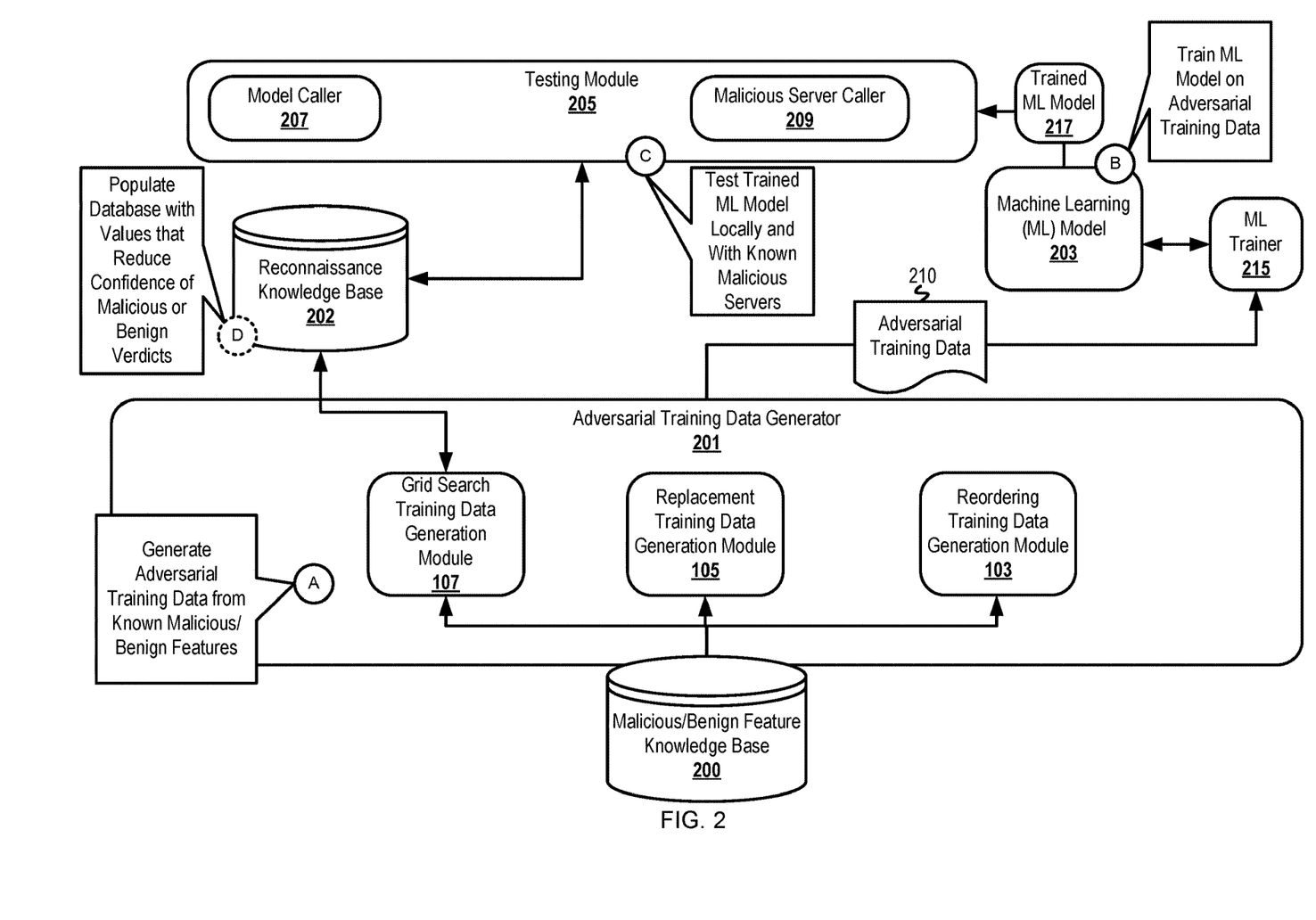
FIG. 2 is a schematic diagram of an example system for generating adversarial training data to train and test MIL models for malicious PDU detection.

FIG. 2 is a schematic diagram of an example system for generating adversarial training data to train and test ML models for malicious PDU detection. FIG. 2 is annotated with a series of letters A-D. Each stage represents one or more operations. Although these stages are ordered for this example, the stages illustrate one example to aid in understanding this disclosure and should not be used to limit the claims. Subject matter falling within the scope of the claims can vary from what is illustrated.

At stage A, an adversarial training data generator ("generator") 201 that comprises the grid search module 107, the replacement module 105, and the reordering module 103 generates adversarial training data 210. The modules 103, 105, 107 generate the adversarial training data 210 from a malicious/benign feature knowledge base 200 comprising features for PDUs with ground truth malicious/benign verdicts. The malicious/benign feature knowledge base 200 is populated with features of known malicious/benign PDUs from previous malicious attack detections, for instance by cybersecurity models not depicted in FIG. 2. For instance, the features can comprise values of HTTP header fields and indications of the type of HTTP header fields for each PDU. Each augmented version of a PDU by the modules 103, 105, 107 has a malicious/benign label corresponding to the ground truth verdict for the original PDU when added to the adversarial training data 210. Due to the modular architecture of the generator 201, modules can be combined, omitted, and added during generation of the adversarial training data 210. The modules 103, 105, 107 are depicted due to having minimal to no impact on functionality of HTTP PDUs during generation of the adversarial training data 210. Generating training data with variations of PDUs that do not affect functionality mimics the behavior of malicious attackers attempting to alter malicious PDUs to circumvent malware detection systems while keeping functionality of the PDUs to perform a malicious attack, e.g., a C2 attack.

Figure 3:
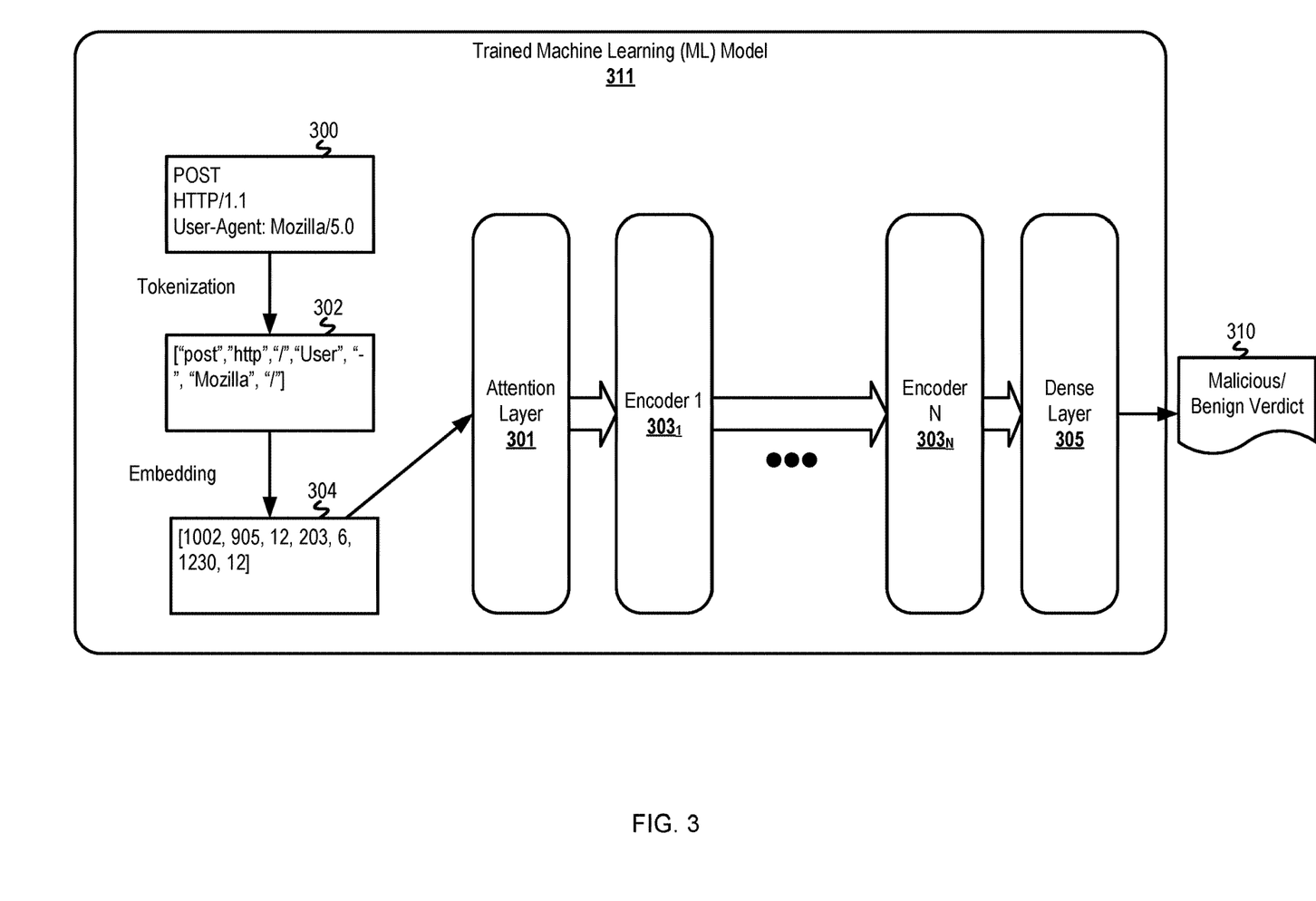
FIG. 3 is a schematic diagram of an example ML model trained on adversarial training data to detect malicious PDUs.

At stage B, a trainer 215 receives the adversarial training data 210 and trains a ML model 203 to detect malicious PDUs. Operations for training depend on architecture of the ML model 203. For instance, for a neural network the trainer 215 can initialize internal parameters and then train the ML model 203 across batches and epochs until training criteria are satisfied, e.g., that training/testing/validation error are sufficiently low, that a threshold number of batches/epochs has elapsed, that internal parameters of the ML model 203 are converging across iterations, etc. An example architecture of the ML model 203 is depicted in FIG. 3.

At stage C, a testing module 205 tests the trained ML model 217 locally and with PDUs received from known malicious servers. A model caller 207 tests the trained ML model 217 locally, for instance with a subset of the adversarial training data 210 identified as testing data. A malicious server caller 209 queries known malicious servers for PDUs (e.g., HTTP PDUs) and inputs PDUs returned by the malicious servers into the trained ML model 217. Testing error for the trained ML model 217 on PDUs returned by the malicious servers is thus the percentage of PDUs classified as benign by the trained ML model 217. If local testing error and testing error for malicious server PDUs is sufficiently low (e.g., below a threshold(s)), the testing module 205 deploys the trained ML model 217 for malicious PDU detection.

At stage D, a reconnaissance knowledge base ("knowledge base") 202 is populated with metrics for values of fields of PDUs that reduce confidence of malicious or benign verdicts. Stage D is depicted with a dashed outline to indicate that the operations at stage D can occur asynchronously with respect to operations at stages A, B, and C and substantially continuously to populate the knowledge base 202. The knowledge base 202 communicates to the grid search module 107 metrics for values of PDU fields (e.g., HTTP header fields) that quantify the impact that replacing fields with those values has on confidence of malicious/benign verdicts by the ML model 203. The grid search module 107 then uses those values to inform grid search in future generation of adversarial training data, for instance by biasing replacement of values of fields towards those values that most affect confidence of malicious verdicts.

The knowledge base 202 additionally communicates with the testing module 205 to determine the metrics that quantify impact of values of fields on malicious/benign verdicts. For instance, the knowledge base 202 or an interface thereof can query the testing module 205 for confidence values of verdicts by the trained ML model 217 for PDUs with a target value and PDUs with the target value of a field. The metric for the target value can then be an average difference between confidence values of verdicts for PDUs with the target value and without the target value. To exemplify, if a PDU with the target value has confidence value c of a malicious verdict by the trained ML model 217 and PDUs without the target value have confidence values $c_1, \ldots, c_n$, then the metric can be computed as $$m = ((c - c_1) + \ldots + (c - c_n))/n$$

The above metric m thus indicates whether the target value has a positive or negative impact on confidence. Multiple PDUs with the target value can be used to compute m resulting in a sum of multiple averages for each of the multiple PDUs. The PDUs without the target value can comprise PDUs with identical values of each field except for the field of the target value to isolate the effect of changing to the target value.

At an initial iteration of generating the adversarial training data 210 when the knowledge base 202 has no information, the grid search module 107 can perform a naïve search through values of fields. At subsequent iterations as the ML model 203 is trained and tested and the knowledge base 202 is populated with metrics for values of PDU fields, the grid search module 107 can, when iterating through values for a PDU field, bias towards values with a lower impact on confidence of malicious verdicts (i.e., that decrease confidence values of a malicious verdict and thus increase confidence values of a benign verdict) as observed in previous PDU verdicts. The grid search module 107 can additionally add fields and, if the confidence of a malicious verdict increases as a result, remove the fields and store indications of which fields to use in the knowledge base 202 accordingly.

FIG. 3 is a schematic diagram of an example ML model trained on adversarial training data to detect malicious PDUs. A trained ML model 311 trained to detect malicious PDUs comprises an attention layer 301, encoders $303_1, \ldots, 303_N$, and a dense layer 305. The trained ML model 311 additionally comprises preprocessing layers such as tokenization layers and embedding layers. An example input 300 comprises HTTP header fields with the following values:

POST
HTTP/1.1
User-Agent: Mozilla/5.0
The tokenization layer of the trained ML model 311 tokenizes the example input to generate example token vector 302:
["post", "http", "/", "User", "-", "Mozilla", "/" ]
The embedding layer performs one hot encoding or other natural language processing embedding technique to generate example embeddings 304:
[1002, 905, 12, 203, 6, 1230, 12]
Embeddings output by the preprocessing layers comprise inputs to the attention layer 301.

The attention layer 301 determines which of the token embeddings are important for malicious PDU detection to increase quality of a malicious/benign verdict 310 output by the trained ML model 311. Each of the encoders $303_1, \ldots, 303_N$ comprises a recurrent architecture. The architecture of the trained ML model 311 is provided as an example and any ML classification model can be implemented. Additional layers such as convolutional layers, recurrent layers, long short-term memory layers, etc. are anticipated.

The example operations are described with reference to an adversarial training data generator ("generator"), a trainer, a testing module, and a knowledge base for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 4:
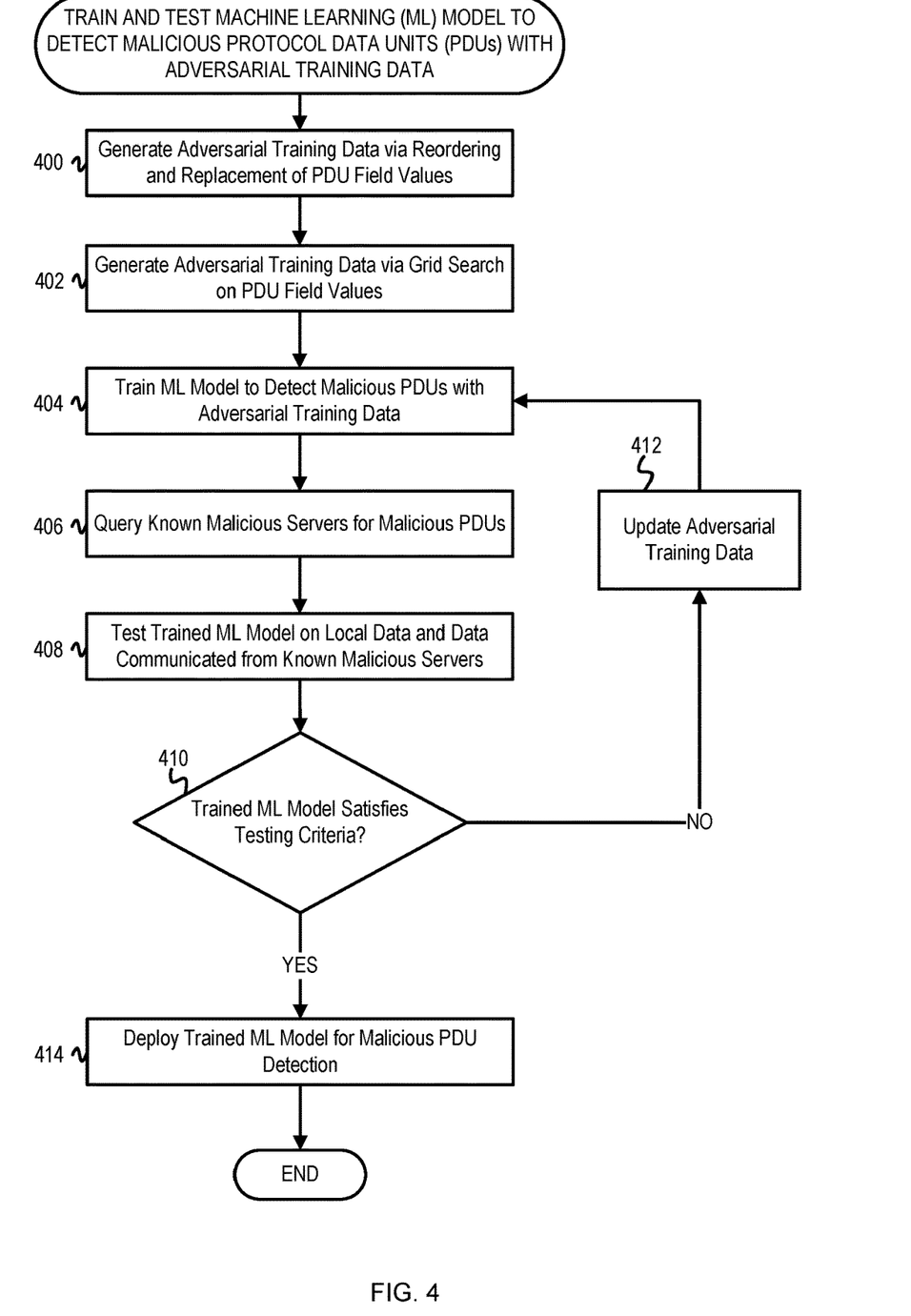
FIG. 4 is a flowchart of example operations for training and testing a ML model to detect malicious PDUs with adversarial training data.

FIG. 4 is a flowchart of example operations for training and testing a ML model to detect malicious PDUs with adversarial training data. At block 400, a generator generates adversarial training data via reordering and replacement of PDU field values. For instance, for HTTP header fields, reordering can comprise randomly permuting header fields and corresponding values apart from the first header field (i.e., the HTTP request method or HTTP response status code). The generator can choose the permutations by permuting pairs of header fields chosen uniformly at random, by randomly permuting k-tuples of header fields for some parameter k, etc. The number and type of permutations can vary and can depend on the number of header fields in each PDU. The generator can replacement PDU field values by randomly selecting header fields (e.g., uniformly at random or according to a biased probability distribution that favors high importance or low importance header fields) and replacing values of those header fields with a value chosen at random from a list of known values for that header field. Operations for reordering and replacement can additionally comprise removing low importance HTTP header fields known to have negligible or no impact on functionality of the corresponding PDUs.

At block 402, the generator generates adversarial training data via grid search on PDU field values. At a first iteration of generating adversarial training data, prior to populating a knowledge base with metrics that indicate impact on confidence of malicious verdicts by a trained ML model from replacing corresponding values of PDU fields, the generator can generate adversarial data according to a naïve grid search algorithm. For instance, for each original PDU of training data, the generator can iterate through a product space of HTTP field values, wherein the product space has, for each HTTP field, a list of known HTTP field values. The product space can be tuned by the generator to preclude certain HTTP fields and certain HTTP field values based on domain level knowledge.

At block 404, a trainer trains an ML model to detect malicious PDUs with the adversarial training data generated from reordering, replacement, and grid search. The trainer can train the ML model based on architecture and type of the ML model. For instance, for a neural network ML model (e.g., a recurrent neural network with attention layers and encoders). Training occurs until training criteria are satisfied, e.g., until a threshold number of training epochs/batches has occurred, until internal parameters of the ML model converge, until training/testing/validation loss on the adversarial training data is sufficiently low, etc.

At block 406, a testing module queries known malicious servers for malicious PDUs. For instance, the testing module can maintain a list of malicious servers known to correspond to C2 attacks. The testing module can communicate HTTP requests to the known malicious servers and collect and store HTTP responses in a database for training. Additionally, the testing module can store HTTP requests communicated by the known malicious servers for cybersecurity attacks. Each stored HTTP request and HTTP response from the known malicious servers is associated with a malicious verdict. Querying of the known malicious servers can occur once the ML model is trained or periodically to maintain up-to-date malicious PDUs for testing.

At block 408, the testing module tests the trained ML model on local data and data communicated from the known malicious servers. Local data can comprise the adversarial training data as well as holdout data for testing. Testing comprises determining a false positive and false negative rate for malicious PDU detections by the trained ML model.

At block 410, the testing module determines whether the trained ML model satisfies testing criteria. For instance, the testing module can determine whether false positive rate and/or false negative rate for the trained ML model on the local data and data communicated from the known malicious servers are below corresponding thresholds. If the testing criteria are satisfied, operational flow proceeds to block 414. Otherwise, operational flow proceeds to block 412.

At block 412, the generator updates the adversarial training data. Updating the adversarial training data can comprise collecting additional PDUs and performing reordering, replacement, and grid search of PDU field values thereof. Additionally, grid search can be optimized using a reconnaissance knowledge base that indicates whether replacing PDU field values will lower confidence of malicious verdicts by the trained ML model during updating of the adversarial training data and prior to retraining the trained ML model. Operations for grid search in combination with a knowledge base are described in reference to FIG. 5. Operational flow returns to block 404 to retrain the ML model on the updated adversarial training data.

At block 414, the testing module deploys the trained ML model for malicious PDU detection. For instance, the trained ML model can be deployed at a firewall running natively on an endpoint device on in the cloud. The firewall or other cybersecurity system can be configured for corrective action based on malicious verdicts by the trained ML model.

Figure 5:
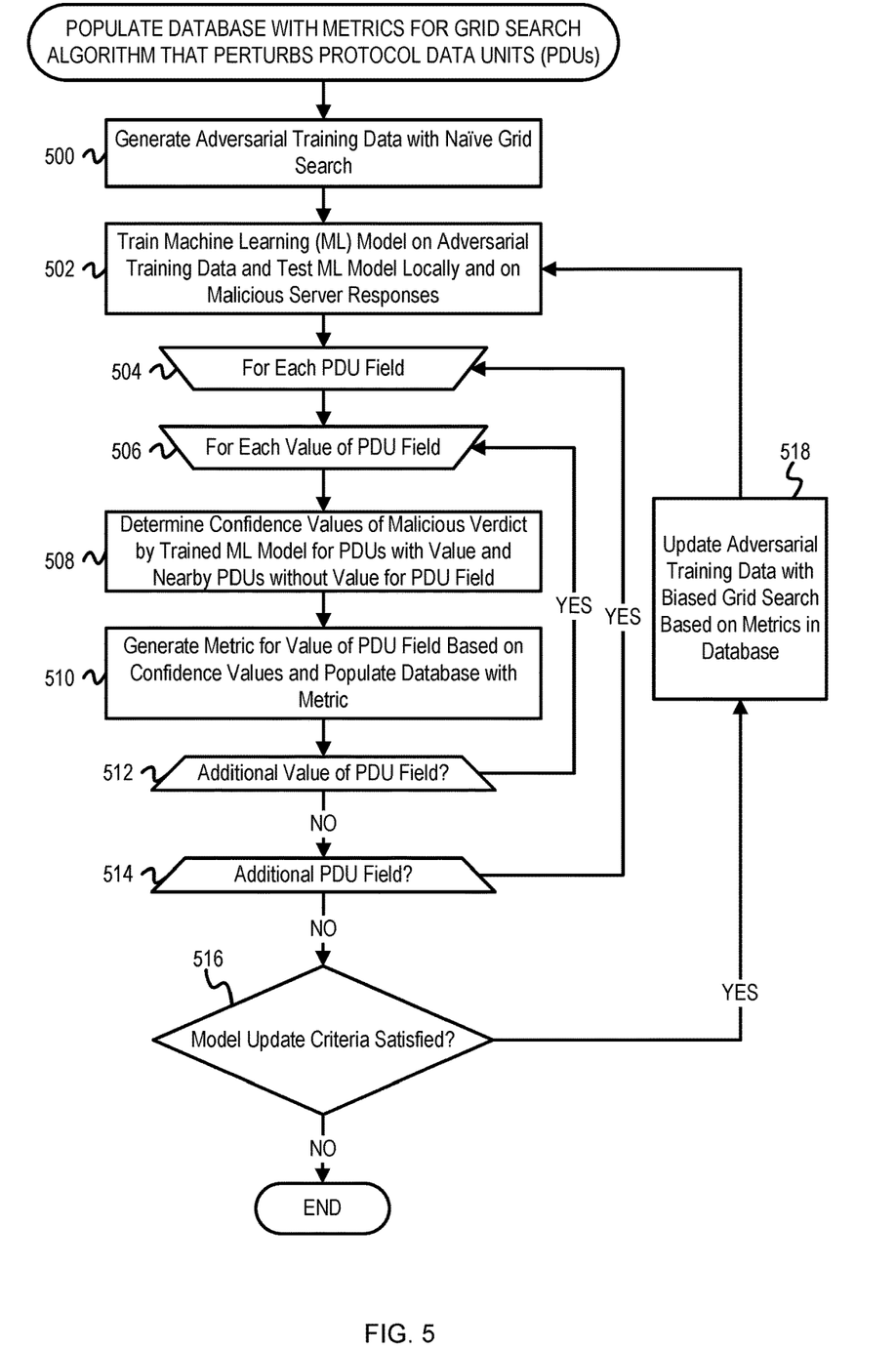
FIG. 5 is a flowchart of example operations for populating a database with metrics for a grid search algorithm that perturbs PDUs.

FIG. 5 is a flowchart of example operations for populating a database with metrics to inform a grid search algorithm that perturbs PDUs. The metrics guide iterations of the grid search algorithm, such as by biasing towards or away from PDU field values at each iteration. The type of grid search algorithm can vary and the method of incorporating the metrics can additionally vary according to the algorithm. As an illustrative example, at each iteration, when replacing a PDU field value, the replacement can be chosen according to a probability distribution that favors PDU field values of the corresponding PDU field having lower metrics (i.e., field values that are more likely to decrease confidence in a malicious verdict).

At block 500, a generator generates adversarial training data with naïve grid search. For each PDU of training data, the generator determines a product space for values of PDU fields and iterates through the product space by replacing values of PDU fields in the PDU of training data with values according to the product space. For instance, for a product space of two PDU fields comprising values $\{f_1, f_2\} \times \{g_1, g_2\}$, the generator generates versions of each training data PDU having the combination of values $f_1 \, g_1$, $f_1 \, g_2$, $f_2 \, g_1$, and $f_2 \, g_2$ for the corresponding PDU fields. In some implementations, the grid search algorithm can maintain a cache or other data structure of PDUs that have already been generated from previous PDUs of training data and can skip generating these PDUs during iterations through the product space.

At block 502, a trainer trains an ML model on adversarial training data, and a testing module tests the trained ML model locally and on malicious server responses. Training and testing can occur according to the operations described at blocks 404, 406, and 408 in reference to FIG. 4.

At block 504, a knowledge base begins iterating through PDU fields. At block 506, the knowledge base begins iterating through values of each PDU field. The space of PDU fields and PDU field values for iterations can vary and can be fewer than the total space of known PDU fields and PDU field values, for instance to restrict training data generation to PDU fields and PDU field values known to lower confidence of malicious verdicts by trained ML models.

At block 508, the knowledge base determines confidence values of malicious verdicts by the trained ML model for PDUs with the value at the current iteration and nearby PDUs without the value for the PDU field. For each current PDU having the value of the PDU field at the current iteration, the "nearby" PDUs refer to PDUs that are identical to the current PDU with the exception of the current value of the PDU field or that are identical to the current PDU except for a small number of PDU field values (e.g., 3 PDU field values). The knowledge base can maintain a data structure for efficient retrieval of nearby PDUs. In some embodiments, the confidence values are stored during training. The confidence values comprise confidence values output by the trained ML model (e.g., based on cross-entropy loss) prior to a threshold operation to generate a malicious/benign verdict.

At block 510, the knowledge base generates a metric for the value of the PDU field at the current iteration based on the confidence values and populates a database with the metric. For instance, the metric can comprise an average signed difference between confidence values for PDUs with the value at the current iteration and confidence values for corresponding nearby PDUs without the value.

At block 512, the knowledge base continues iterating through values for the current PDU field. If there is an additional value, operational flow returns to block 506. Otherwise, operational flow proceeds to block 514. At block 514, the knowledge base continues iterating through PDU fields. If there is an additional PDU field, operational flow returns to block 504. Otherwise, operational flow proceeds to block 516.

At block 516, the testing module determines whether model update criteria are satisfied. For instance, the model update criteria can comprise that a threshold amount of time has elapsed since the trained ML model was last updated, that testing error is sufficiently high, that a threshold amount of additional training data has been collected, etc. If the model update criteria are satisfied, operational flow proceeds to block 518. Otherwise, the operational flow in FIG. 5 terminates.

At block 518, the generator updates the adversarial training data with biased grid search based on the metrics in the database. In some embodiments, the generator can restrict the product space for iterations of grid search to preclude PDU field values with low metrics (i.e., values that lower confidence of malicious verdicts by the trained ML model). The biased grid search comprises a grid search that biases towards PDU field values with higher metrics. The generator can additionally update the adversarial data with operations such as reordering and replacement of PDU field values. Operational flow returns to block 502 for retraining the ML model to detect malicious PDUs.

Variations

The various embodiments for generating adversarial training data for machine learning models are described for manipulating HTTP header fields. Other protocols such as Dynamic Host Configuration Protocol (DHCP) and Domain Name System (DNS) protocol and manipulating fields of PDUs for these protocols are anticipated. Adversarial training data can be generated for any protocol that admits PDU manipulations that do not or minimally affect functionality of the PDUs.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 508 and 510 can be performed in parallel or concurrently across PDU fields and PDU field values. With respect to FIG. 4, testing trained ML models based on querying known malicious servers is not necessary. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 6:
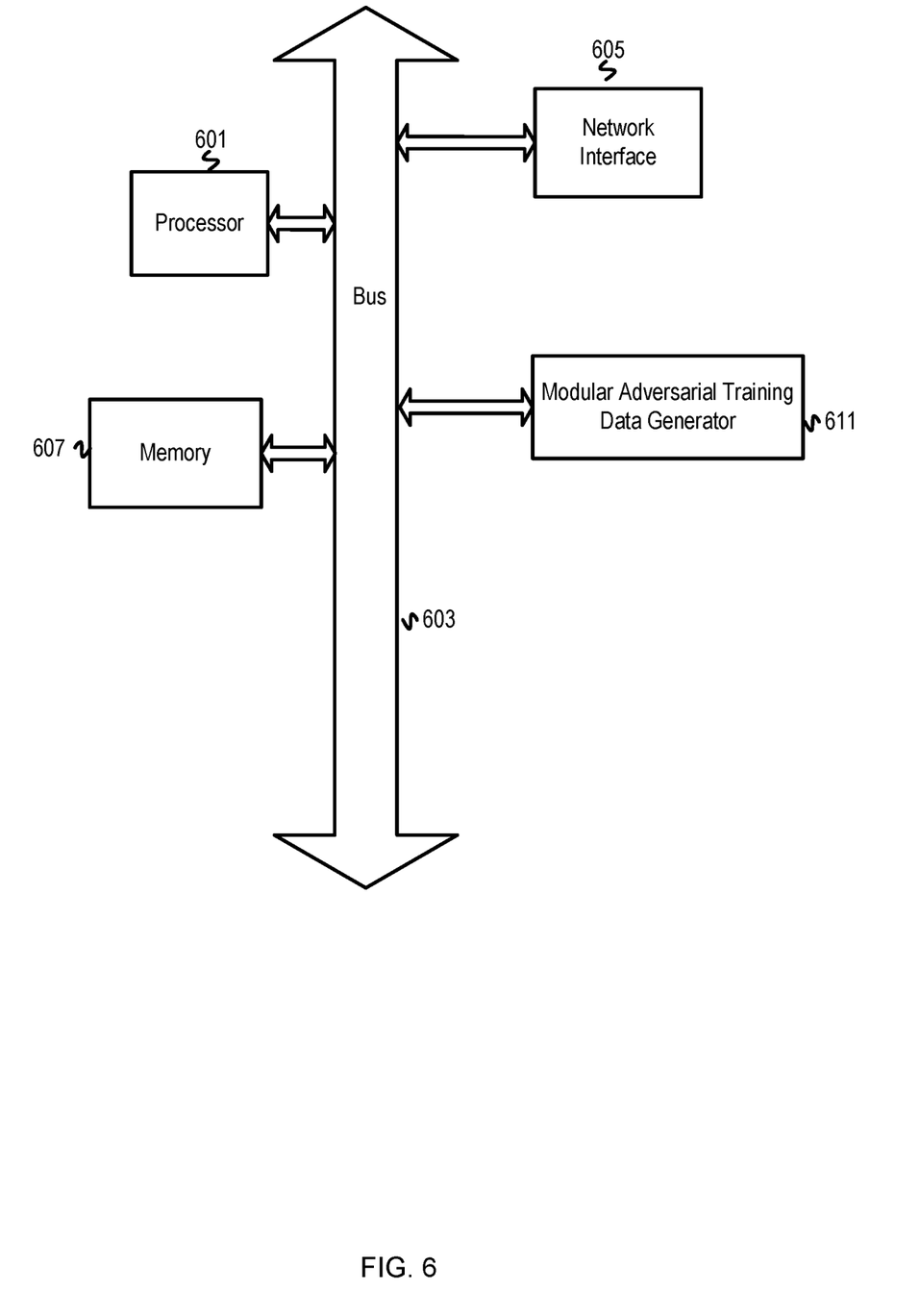
FIG. 6 depicts an example computer system with a modular adversarial training data generator.

FIG. 6 depicts an example computer system with a modular adversarial training data generator. The computer system includes a processor 601 (possibly including multiple processors, multiple cores, multiple nodes, and/or implementing multi-threading, etc.). The computer system includes memory 607. The memory 607 may be system memory or any one or more of the above already described possible realizations of machine-readable media. The computer system also includes a bus 603 and a network interface 605. The system also includes a modular adversarial training data generator ("generator") 611. The generator 611 generates adversarial training data that mimics malicious cyber-attacks such as C2 attacks that perturb PDUs to bypass malicious detection systems. The generator 611 perturbs PDUs of training data with reordering, replacement, and grid search of PDU field values to generate adversarial training data for a ML model that detects malicious PDUs. The generator 611 additionally populates a knowledge base from testing trained ML models with metrics that quantify impact of replacing values of PDU fields on confidence values of malicious verdicts by the trained ML models. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
perturbing a first plurality of protocol data units (PDUs) to generate a second plurality of PDUs, wherein perturbing the first plurality of PDUs comprises,
removing low importance fields of PDUs in the first plurality of PDUs; and
at least one of reordering fields of PDUs in the first plurality of PDUs, randomly replacing values of fields of PDUs in the first plurality of PDUs, and iteratively replacing values of a subset of fields in the first plurality of PDUs with values in lists of known values for the subset of fields; and
training one or more machine learning models to detect malicious network traffic with the second plurality of PDUs, wherein the second plurality of PDUs have been labeled to indicate whether each of the second plurality of PDUs corresponds to known malicious or benign network traffic.

2. The method of claim 1, wherein the fields of PDUs comprise header fields in Hypertext Transfer Protocol PDUs.

3. The method of claim 1, wherein iteratively replacing the values of the subset of fields in the first plurality of PDUs comprises iteratively replacing the values with the values in the lists according to a grid search algorithm.

4. The method of claim 3, wherein iteratively replacing the values with the values in the lists according to the grid search algorithm comprises iteratively replacing values of the subset of fields with values corresponding to metrics that indicate decrease in confidence that corresponding perturbed PDUs are classified as malicious by the one or more trained machine learning models.

5. The method of claim 4, further comprising,
receiving one or more PDUs from one or more known malicious servers; and
determining the metrics for the grid search algorithm based, at least in part, on confidence values that the one or more PDUs are malicious output by the one or more trained machine learning models from inputting the one or more PDUs.

6. The method of claim 1, wherein a subset of the first plurality of PDUs corresponding to malicious network traffic comprises PDUs for command and control attacks.

7. The method of claim 1, wherein replacing values of fields in malicious PDUs of the first plurality of PDUs comprising replacing values of fields with values for known malicious PDUs, wherein replacing values of fields in benign PDUs of the first plurality of PDUs comprising replacing values of fields with values for known benign PDUs.

8. A non-transitory, machine-readable medium having program code stored thereon, the program code comprising instructions to:
identify a first plurality of protocol data units (PDUs) corresponding to known malicious or benign network traffic;
perturb fields of the first plurality of PDUs, wherein the instructions to perturb fields of the first plurality of PDUs comprise at least one of instructions to reorder fields of PDUs in the first plurality of PDUs, instructions to randomly replace values of fields of PDUs in the first plurality of PDUs, and instructions to iteratively replace values of a subset of fields in the first plurality of PDUs with values in lists of known values for the subset of fields to generate a second plurality of PDUs; and train one or more machine learning models to detect malicious network traffic with the second plurality of PDUs and labels indicating whether each of the second plurality of PDUs corresponds to known malicious or benign network traffic.

9. The machine-readable medium of claim 8, wherein the fields of PDUs comprise header fields in Hypertext Transfer Protocol PDUs.

10. The machine-readable medium of claim 8, wherein the instructions to iteratively replace the values of the subset of fields in the first plurality of PDUs comprise instructions to iteratively replace the values according to a grid search algorithm.

11. The machine-readable medium of claim 10, wherein the instructions to iteratively replace the values according to the grid search algorithm comprise instructions to iteratively replace values of the subset of fields with values corresponding to metrics that indicate decrease in confidence that corresponding perturbed PDUs are classified as malicious by the one or more trained machine learning models.

12. The machine-readable medium of claim 11, wherein the program code further comprises instructions to,
receive one or more PDUs from one or more known malicious servers; and
determine the metrics for the grid search algorithm based, at least in part, on confidence values that the one or more PDUs are malicious as outputs from inputting the one or more PDUs to the one or more trained machine learning models.

13. The machine-readable medium of claim 8, wherein a subset of the first plurality of PDUs corresponding to malicious network traffic comprises PDUs for command and control attacks.

14. The machine-readable medium of claim 8, wherein the instructions to replace values of fields in malicious PDUs of the first plurality of PDUs comprise instructions to replace values of fields with values for known malicious PDUs, wherein the instructions to replace values of fields in benign PDUs of the first plurality of PDUs comprise instructions to replace values of fields with values for known benign PDUs.

15. An apparatus comprising:
a processor; and
a machine-readable medium having instructions stored thereon that are executable by the processor to cause the apparatus to,
identify a first plurality of protocol data units (PDUs) corresponding to known malicious or benign network traffic;
perturb fields of the first plurality of PDUs, wherein the instructions to perturb fields of the first plurality of PDUs comprise instructions executable by the processor to cause the apparatus to, at least one of, reorder fields of PDUs in the first plurality of PDUs, randomly replace values of fields of PDUs in the first plurality of PDUs, and iteratively replace values of a subset of fields in the first plurality of PDUs with values in lists of known values for the subset of fields to generate a second plurality of PDUs; and
train one or more machine learning models to detect malicious network traffic with the second plurality of PDUs and labels indicating whether each of the second plurality of PDUs corresponds to known malicious or benign network traffic.

16. The apparatus of claim 15, wherein the fields of PDUs comprise header fields in Hypertext Transfer Protocol PDUs.

17. The apparatus of claim 15, wherein the instructions to iteratively replace the values of the subset of fields in the first plurality of PDUs comprise instructions executable by the processor to cause the apparatus to iteratively replace the values according to a grid search algorithm.

18. The apparatus of claim 17, wherein the instructions to iteratively replace the values according to the grid search algorithm comprise instructions executable by the processor to cause the apparatus to iteratively replace values of the subset of fields with values corresponding to metrics that indicate decrease in confidence that corresponding perturbed PDUs are classified as malicious by the one or more trained machine learning models.

19. The apparatus of claim 18, wherein the machine-readable medium further has stored thereon instructions executable by the processor to cause the apparatus to,
receive one or more PDUs from one or more known malicious servers; and
determine the metrics for the grid search algorithm based, at least in part, on confidence values that the one or more PDUs are malicious as outputs from inputting the one or more PDUs to the one or more trained machine learning models.

20. The apparatus of claim 15, wherein a subset of the first plurality of PDUs corresponding to malicious network traffic comprises PDUs for command and control attacks.

* * * * *